United States Patent
Kumar et al.

(10) Patent No.: US 10,911,538 B2
(45) Date of Patent: Feb. 2, 2021

(54) MANAGEMENT OF AND PERSISTENT STORAGE FOR NODES IN A SECURE CLUSTER

(71) Applicant: Fortanix, Inc., Menlo Park, CA (US)

(72) Inventors: Ambuj Kumar, Sunnyvale, CA (US); Anand Kashyap, Los Altos, CA (US); Jethro Gideon Beekman, San Francisco, CA (US); Faisal Faruqui, Fremont, CA (US); Andrew Leiserson, San Francisco, CA (US)

(73) Assignee: Fortanix, Inc., Menlo Park, CA (US)

( * ) Notice: Subject to any disclaimer, the term of this patent is extended or adjusted under 35 U.S.C. 154(b) by 500 days.

(21) Appl. No.: 15/484,887

(22) Filed: Apr. 11, 2017

(65) Prior Publication Data
US 2018/0295115 A1    Oct. 11, 2018

(51) Int. Cl.
H04L 29/08    (2006.01)
H04L 29/06    (2006.01)

(52) U.S. Cl.
CPC ...... *H04L 67/1097* (2013.01); *H04L 63/0428* (2013.01); *H04L 63/06* (2013.01); *H04L 63/12* (2013.01)

(58) Field of Classification Search
USPC ............... 713/171, 150, 163; 726/2, 21, 36; 380/255, 264, 276
See application file for complete search history.

(56) References Cited

U.S. PATENT DOCUMENTS

| | | | | |
|---|---|---|---|---|
| 9,703,981 B1 * | 7/2017 | Marion | ............... | H04W 12/06 |
| 9,832,171 B1 * | 11/2017 | Roth | ................. | H04L 9/3213 |
| 2007/0245414 A1 * | 10/2007 | Chan | ................. | H04L 9/3234 |
| | | | | 726/12 |
| 2010/0211799 A1 * | 8/2010 | Gladstone | ........... | H04L 9/0891 |
| | | | | 713/189 |
| 2011/0276490 A1 * | 11/2011 | Wang | .................... | H04L 9/14 |
| | | | | 705/50 |
| 2013/0054966 A1 * | 2/2013 | Clay | .................... | H04L 63/104 |
| | | | | 713/168 |
| 2014/0270179 A1 * | 9/2014 | Shen | ................... | H04L 9/0825 |
| | | | | 380/282 |
| 2017/0250972 A1 * | 8/2017 | Ronda | ................. | H04L 9/3236 |

* cited by examiner

*Primary Examiner* — Sharif E Ullah
(74) *Attorney, Agent, or Firm* — Lowenstein Sandler LLP

(57) ABSTRACT

Authentication information at a first portion of encrypted data may be identified. A cryptographic key may be derived based on a combination of an identification of the first portion of the received encrypted data and a master key. Additional authentication information may be generated based on a combination of the derived cryptographic key and another portion of the received encrypted data. The encrypted data may be verified by comparing the authentication information at the first portion of the received encrypted data with the generated additional authentication information. In response to verifying the received encrypted data, a second cryptographic key may be derived based on a combination of an identification of the another portion of the encrypted data and the master key. The other portion of the received encrypted data may be decrypted by using the second cryptographic key.

17 Claims, 9 Drawing Sheets

| 410 | 420 | 430 | ... | Volume | MAC | MAC2 | 470 |
|---|---|---|---|---|---|---|---|
| ID | Name | Type | ... | | | | Proximity |
| | 3 | | ... | | | | 7 |
| | 7 | | ... | | | | 9 |
| | 9 | | ... | | | | ... |

FIG. 4

MANAGEMENT OF AND PERSISTENT STORAGE FOR NODES IN A SECURE CLUSTER

TECHNICAL FIELD

Aspects of the present disclosure relate generally to secure data storage in a cluster, and more specifically, relate to the management of and persistent storage for nodes in a secure cluster.

BACKGROUND

Data may be securely stored by encrypting the data at a storage resource. A cluster of nodes may access the encrypted data at the storage resource. For example, the cluster of nodes may be part of a distributed system of nodes that provides secure access to underlying data that has been encrypted at the storage resource. The nodes of the cluster may each retrieve the encrypted data and may decrypt the encrypted data to obtain the data. Furthermore, the encrypted data may be decrypted by using a cryptographic key. For example, each of the nodes of the cluster may use the cryptographic key to decrypt the encrypted data that has been retrieved from the storage resource.

BRIEF DESCRIPTION OF THE DRAWINGS

The present disclosure will be understood more fully from the detailed description given below and from the accompanying drawings of various implementations of the disclosure.

FIG. 4 illustrates a data structure representing secure data stored at a storage resource that is accessed by nodes in a secure cluster in accordance with some embodiments of the present disclosure.

DETAILED DESCRIPTION

Figure 1:
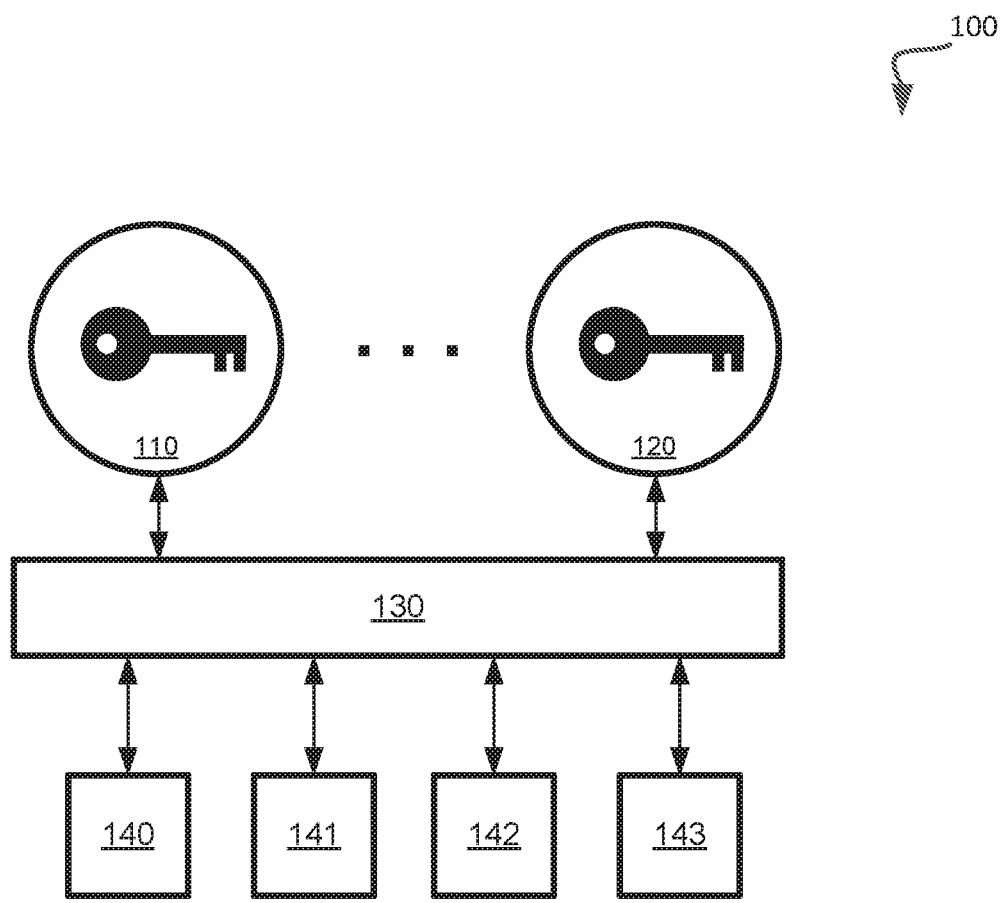
FIG. 1 illustrates an example environment to provide management of nodes in a secure cluster in accordance with some embodiments.

Aspects of the present disclosure relate to management of nodes in a secure cluster. In general, the secure cluster may correspond to a data center or network cluster that may include multiple network servers where each network server may be considered a node of the network cluster. Each node of the network cluster may provide access to secure data at a storage resource of the network cluster. For example, data may be encrypted at the storage resource and each of the nodes of the network cluster may include a cryptographic key to decrypt the encrypted data. As such, each of the nodes may access the storage resource and may use a copy of the same cryptographic key to encrypt or decrypt data at the storage resource.

The data at the shared resource of the network cluster must be secure so that unauthorized entities may not be able to retrieve the data while also allowing any node of the network cluster to be able to retrieve and decrypt the encrypted data. Thus, each node in the network cluster may include a cryptographic key that is used to decrypt and encrypt the data stored at a single storage resource that is shared among each of the nodes of the network cluster. Each node in the network cluster may thus use the cryptographic key to retrieve encrypt data, decrypt the encrypted data, modify the data, and then store the encrypted modified data at the storage resource. The cryptographic key may be referred to as a master key. The cryptographic key may also be derived from a master key using, for example, a key derivation function (KDF).

In addition to ensuring that the data stored at the storage resource is secure from an unauthorized entity, each of the nodes of the network cluster may further verify an integrity of the data at the storage resource. For example, each of the nodes may perform an operation to verify the integrity of the data at the storage resource when retrieving the data. For example, each portion of data at the storage resource may be associated with a message authentication code (MAC), or other such authentication information, that is generated based on the master key that is used to encrypt the data. For example, a new cryptographic key may be derived based on a combination of the master key and additional information associated with the portion of the data. A node may retrieve the portion of data with the corresponding MAC and may generate another MAC based on its own master key and additional information associated with the portion of the data. The node may then compare its generated MAC with the corresponding MAC of the retrieved portion of the data. If the generated MAC matches with the corresponding MAC of the retrieved portion of the data, then the node may determine that the retrieved portion of the data is valid. The MAC may further be used to determine that the retrieved portion of the data is the latest version of the retrieved portion as described in further detail below.

As previously described, each of the nodes of the network cluster may access the storage resource. Thus, each node may provide a query for a portion of data stored at the storage resource. If a node provides a query for data that is not presently at the storage resource, then the storage resource may provide a response that the requested data is not presently stored. As described in more detail below, each node may perform another operation to verify that the requested data is not presently stored at the storage resource. For example, an order preserving encryption (OPE) operation may be used to encrypt data of a record. For example, the response from the storage resource may include records in numerical proximity to the record of the requested data. The requesting node may then generate another MAC based on the records in numerical proximity and compare this generated MAC to a MAC of one of the records in numerical proximity that were received from the storage resource. If the generated MAC matches the MAC of one of the records in numerical proximity to a requested record, then the node may determine that the requested record is not presently stored at the storage resource. Furthermore, the records may include data specifying its proximity to other records as described in further detail below.

Furthermore, new nodes may be added to the network cluster and may be provided the master key to encrypt and decrypt the data at the storage resource. Since the master key may be a secret key used by nodes of the network cluster, an authentication of new nodes added to the network cluster may be performed before the master key is provided to the new node.

Advantages of the present disclosure include, but are not limited to, the secure storage of data at the storage resource that is retrievable by multiple nodes of the network cluster. The integrity of the data may be maintained by the use of the master key that is known to each node and operations to perform a verification of retrieved data by using the master key. Furthermore, nodes may confirm the absence of data at the storage resource by additional operations that are based on the same master key. As a result, operations may be used to ensure the security of data, the integrity of data, and a validity of data at a storage resource that is used by multiple nodes of a network cluster.

FIG. 1 illustrates an example environment 100 to provide management of nodes in a secure cluster. The environment 100 may correspond to a network cluster that includes nodes 110 and 120 that are part of the network cluster that uses a shared storage resource 130 that is based on storage devices.

As shown in FIG. 1, the environment 100 may correspond to a network cluster (i.e. a secure cluster) that includes nodes 110 and 120. Although two nodes are shown as being part of the network cluster, any number of nodes may be included in the network cluster. Each of the nodes 110 and 120 may correspond to a self-encrypting key management service. As described in more detail below with regards to FIG. 2, each self-encrypting key management service that is represented by a node may be assigned or designated to a secure enclave by a processing device so that data of the self-encrypting key management service that is stored at the storage resource 130 that is based on the storage devices 140, 141, 142, and 143 may not be read from or written to except by the secure enclave. In general, the nodes 110 and 120 may be used to retrieve data stored at the storage resource 130 and to decrypt the retrieved data based on a master key that is known to the nodes 110 and 120. The nodes 110 and 120 may perform a cryptographic operation with the data and may subsequently provide a result of the cryptographic operation to an application as described with regards to FIG. 2.

In operation, the nodes 110 and 120 may retrieve data from the distributed storage devices 140, 141, 142, and 143 that are represented by the storage resource 130. Furthermore, the storage resource 130 may store encrypted data that is represented by records as described in further detail in conjunction with FIG. 4. Each of the nodes 110 and 120 may provide a request to the storage resource 130 for a particular record of the data. The corresponding record may be retrieved from one of the storage devices 140 through 144 and returned to the requesting node 110 or 120. The requesting node 110 or 120 may subsequently perform a cryptographic operation to verify the received record as described in conjunction with FIG. 3. Furthermore, the requesting node 110 or 120 may verify that a requested record is not stored at the storage resource 130 as described in conjunction with FIG. 5. Additional nodes may be added to the network cluster that is represented by the environment 100. The additional nodes may be provided the master key after an authentication or attestation process as described in conjunction with FIGS. 6-8.

Figure 2:
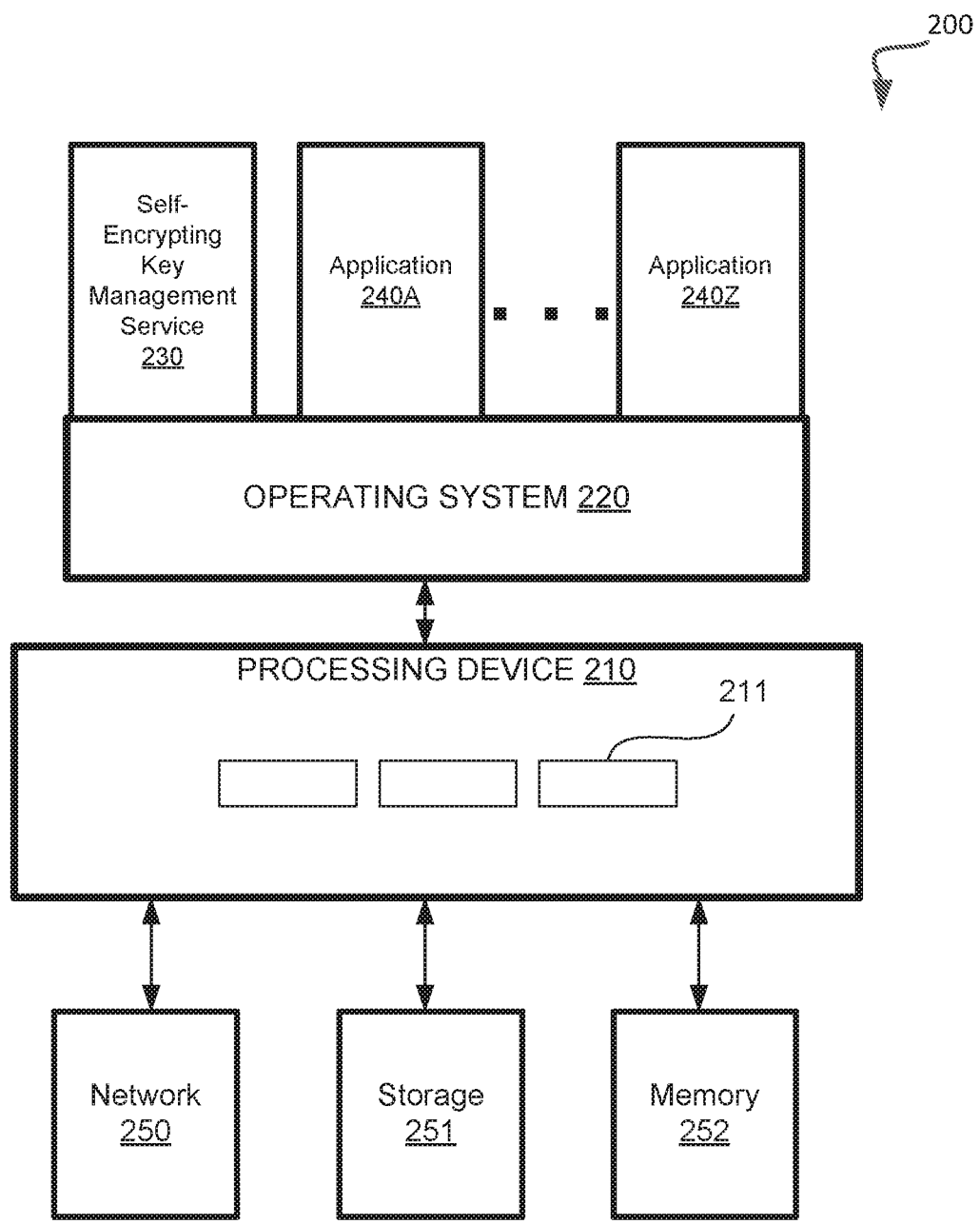
FIG. 2 illustrates an example network server with a self-encrypting key management service to provide management of nodes in a secure cluster in accordance with some embodiments of the present disclosure.

FIG. 2 illustrates an example network server 200 with a self-encrypting key management service to provide secure key management for applications. In general, a self-encrypting key management service 230 may be hosted by a network server to provide secure key management for one or more other applications 240A to 240Z that are also hosted by the network server or another network server. The self-encrypting key management service 230 may correspond to a node 110 or 120 of FIG. 1.

As shown in FIG. 2, the network server 200 may include a processing device 210 that may execute an operating system 220. Furthermore, the processing device 210 may include one or more internal cryptographic keys 211 that may be used to encrypt and decrypt data stored in a portion of a memory that is assigned to a secure enclave of the self-encrypting key management service 230. The access to the data of the self-encrypting key management service 230 in the secure enclave (e.g., data stored at a storage resource) may be protected from the one or more applications 240A to 240Z and the operating system 220. For example, the access to the data of the secure enclave corresponding to the self-encrypting key management service 230 may be protected by the use of one of the internal cryptographic keys 211 that are internal to the processing device 210 so that the access to the data is based on a hardware access as opposed to a software access. The operating system 220 may be associated with a first privilege level and the self-encrypting key management service 230 and the applications 240A to 240Z may be associated with a second privilege level where the first privilege level of the operating system is more privileged than the second privilege level of the various applications that are run on the operating system 220 (e.g., the more privileged level allows access to more resources of the network server than the less privileged level). Thus, the operating system 220 may be allowed access to resources of the applications 240A to 240Z. However, since the self-encrypting key management service 230 is assigned to a secure enclave where access to the data of the secure enclave is based on the use of an internal cryptographic key 211 of the processing device 211, the operating system 220 may not be able to access the data of the self-encrypting key management service 230 despite having a more privileged level of access than the self-encrypting key management service 230. The master key that is used to decrypt data at the storage resource may be an internal cryptographic key 211.

In operation, the self-encrypting key management service 230 may be hosted on the network server 200 with the applications 240A to 240Z. The application 240A may perform a function that may use a cryptographic operation with a cryptographic key. In order to securely store the cryptographic key and perform the cryptographic operation securely, the application 240A may establish a connection with the self-encrypting key management service 230. For example, an attestation procedure may be performed by the application 240A to authenticate the self-encrypting key management service 230. After the self-encrypting key management service 230 has been authenticated, a connection may be considered to be established between the application 240A and the self-encrypting key management service 230. The cryptographic key of the application 240A (e.g., used by cryptographic operation) may be provided to the self-encrypting key management service 230. Since the self-encrypting key management service 230 is assigned to a secure enclave, the data of the self-encrypting key management service 230 may be encrypted and protected by the use of an internal cryptographic key 211 (i.e., the master key) of the processing device 210. For example, the self-encrypting key management service 230 may receive the cryptographic key of the application 240A and may transmit an instruction to the processing device 210 to store the received cryptographic key in the memory of its assigned secure enclave. In some embodiments, the self-encrypting key management service 230 may transmit identification information of the self-encrypting key management service 230 to the processing device 210 for the processing device 210 to load the received cryptographic key from the application 240A in the secure enclave of the self-encrypting key management service 230. The processing device 210 may use an instruction to use one of its internal cryptographic keys 211 that is based on the identification of the self-encrypting key management service 230 to store the received cryptographic key in the memory of the secure enclave of the self-encrypting key management service 230. For example, the received cryptographic key may be securely (e.g., encrypted) stored in the storage 251 or memory 252 associated with the processing device 210 or at another storage resource over a network 250 (e.g., at a storage device of the storage resource). In some embodiments, one of the applications 240A to 240Z may provide a request to the self-encrypting key management service 230 to generate a cryptographic key to be used in a cryptographic operation for the respective application 240A to 240Z. For example, the self-encrypting key management service 230 may generate the cryptographic key and may store the cryptographic key in its memory of the secure enclave.

After the cryptographic key of the application 240A has been loaded in the secure enclave, the application 240A may subsequently request for a cryptographic operation to be performed with its cryptographic key. For example, the application 240A may provide a request to the self-encrypting key management service 230 that identifies the cryptographic operation to be performed. The self-encrypting key management service 230 may subsequently use an instruction so that the processing device 210 may use one of its internal cryptographic keys 211 that is based on the identification of the self-encrypting key management service 230 to decrypt the data of the secure enclave of the self-encrypting key management service 230 and to retrieve the cryptographic key. Subsequently, the cryptographic operation may then be performed (e.g., data may be decrypted or data may be signed by using the retrieved cryptographic key) by the processing device 210 and then the output of the cryptographic operation may be provided to the self-encrypting key management service 230 which may return the output to the application 240A. In some embodiments, the internal cryptographic key 211 may be combined with additional information (e.g., the identification information of the self-encrypting key management service 230) to generate the master key for the self-encrypting key management service 230 that is used to decrypt and/or encrypt data associated with the secure enclave of the self-encrypting key management service 230. Thus, since the processing device 210 uses its internal cryptographic key 211 to decrypt data and to perform the cryptographic operation, the cryptographic key received from the application may not be exposed external to the processing device 210.

As such, a network server may run a self-encrypting key management service (e.g., a node of a network cluster) and an application that may use the self-encrypting key management service for storing or loading keys and managing the use of the keys. Although FIG. 2 illustrates that the self-encrypting key management service 230 may provide secure key management for an application 240A to 240Z on the same network server, the self-encrypting key management service 230 may alternatively be hosted by another network server or may be hosted by another network server that is external to any data center or network cluster that includes the network servers hosting applications 240A to 240Z.

Figure 3:
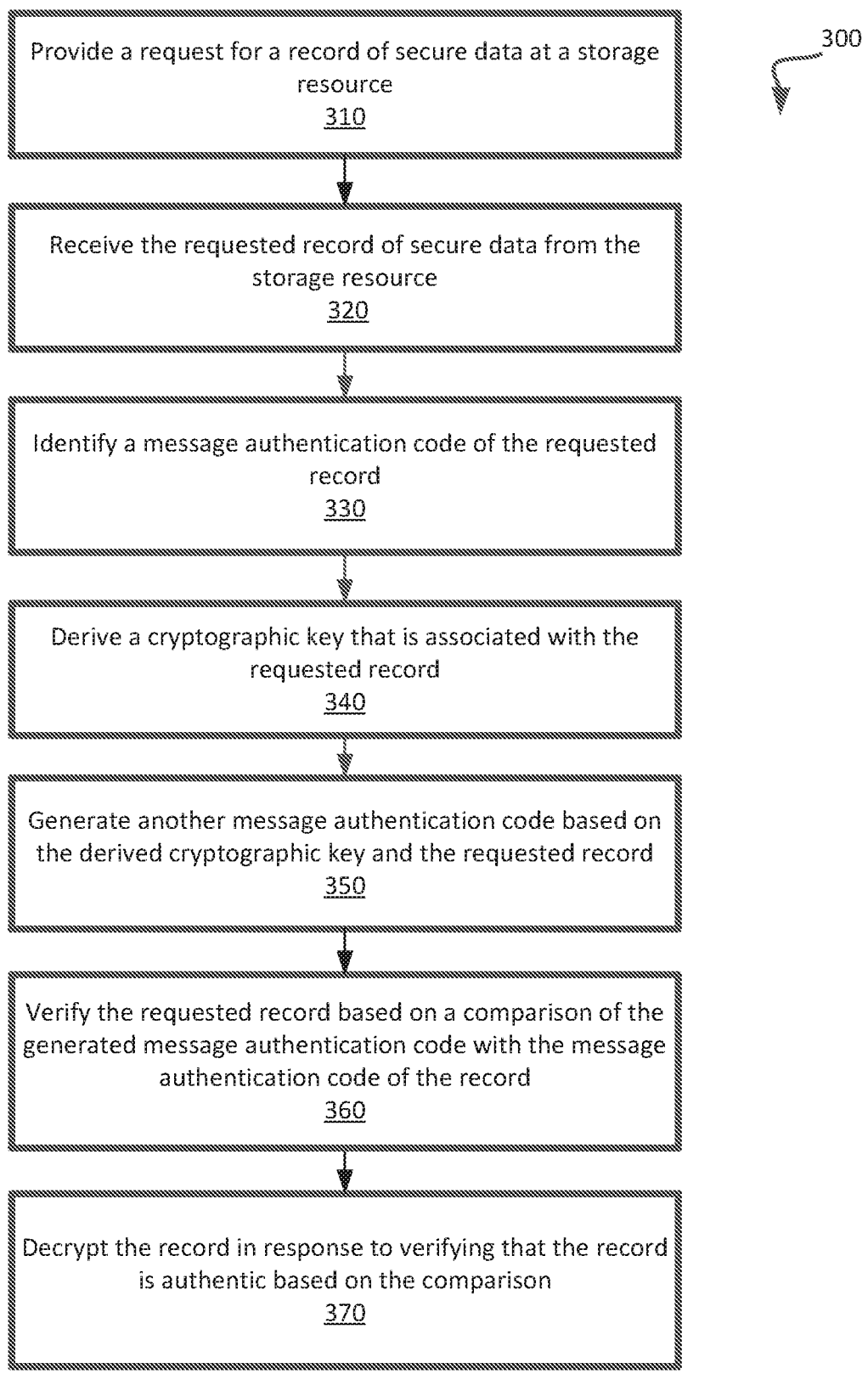
FIG. 3 illustrates a flow diagram of an example method to retrieve a record of secure data and to verify the record of secure data in accordance with some embodiments.

FIG. 3 illustrates a flow diagram of an example method 300 to retrieve a record of secure data and to verify the record of secure data. In general, the method 300 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 may be performed by the node 110 or 120 of FIG. 1 or the self-encrypting key management service 230 of FIG. 2.

As shown in FIG. 3, the method 300 may begin with the processing logic providing a request for a record of secure data at a storage resource (block 310). For example, a node (e.g., a self-encrypting key management service) of a network cluster may provide an identification for a particular record of secure data. The identification may correspond to a numerical value assigned to the record. The numerical value may be based on an order-preserving encryption (OPE) value as described in further detail below. The record may include one or more fields or entries that correspond to one or more portions of data that are each encrypted. The processing logic may subsequently receive the requested record from the storage resource (block 320) and may identify a message authentication code (MAC) of the requested record (block 330). For example, the node may receive the record that includes portions of data that are encrypted. The received record may further include a field or entry that is used to authenticate the validity of the record (e.g., the other portions of the data or other entries or fields of the record). For example, the received record may include a field or entry corresponding to a message authentication code that is based on the contents of the record (e.g., the other encrypted data) and the master key (e.g., another key that is derived based on a combination of the master key and information associated with the MAC) that is used to decrypt the record. Thus, the encrypted data of the record and the MAC of the record may be received by the node from the storage resource. The processing logic may subsequently derive a cryptographic key that is associated with the requested record (block 340). For example, the cryptographic key may be used to verify the validity of the record that is received from the storage resource. Such a cryptographic key may be referred to as a record verification key. In some embodiments, the MAC of the received record may be verified by comparing a MAC generated by the requesting node with the MAC that is included in the entry or field of the received record. For example, the requesting node may generate the record verification key based a combination of the master key and additional information associated with the entry or field of the record that includes the MAC. For example, the record verification key may be derived based on a combination of the master key and additional information associated with the record. The record verification key may then be combined with other contents of the record (e.g., the encrypted data of the other fields or entries of the record) to generate another MAC. The MAC generated by the node may then be compared with the MAC that is included in the record. If the MACs match, then the record may be considered authentic and the encrypted data of the record may be considered valid. Otherwise, if the MACs do not match, then the record may not be considered authentic and the encrypted data of the record may be considered invalid.

In some embodiments, each node of the network cluster may include information identifying a root MAC for a table that includes multiple records. When a record is received from the storage resource, the node may also receive multiple MAC values associated with a table that includes the record. The multiple MAC values may be associated with the data of the requested record and data of at least an additional record as described in further detail below. The requesting node may generate a MAC based on the multiple MAC values and the record verification key and may compare the generated MAC with a root MAC that is known to the node. If the generated MAC matches the root MAC, then the record may be considered authentic and the encrypted data of the record may be considered valid and if the MACs do not match, then the record may not be considered authentic and the encrypted data of the record may be considered invalid.

Referring to FIG. 3, the processing logic may generate another MAC based on the derived cryptographic key and the requested record (block 350) and verify the record based on a comparison of the generated MAC with the MAC that is included with the record (block 360). The other MAC may be generated based a combination of the derived cryptographic key and other encrypted data of the requested record. The processing logic may further decrypt the record based on the comparison (block 370). For example, the record may be decrypted by the node when the MAC generated by the node matches with the MAC that is returned with the record from the storage resource. The record may include one or more fields or entries where each entry or field corresponds to a different portion of encrypted data. Furthermore, the data of each of the fields or entries may be encrypted based on a different cryptographic key that is derived from the master key. For example, data of a first entry or field of the record may be encrypted by a first cryptographic key that is based on a combination of the master key and information identifying the first entry or field (e.g., a title for the first entry or field) and data of a second entry or field of the same record may be encrypted by a second cryptographic key that is derived from a combination of the same master key and information identifying the second entry or field (e.g., a title for the second entry or field). The node may thus derive multiple cryptographic keys based on the master key so that the node may decrypt the encrypted data stored at different entries or fields of the received record.

FIG. 4 illustrates a data structure 400 representing secure data stored at a storage resource that is accessed by nodes in a secure cluster. In general, the data structure 400 may correspond to records that are requested by nodes 110 or 120 from a storage resource 130 of FIG. 1.

As shown in FIG. 4, the data structure 400 may include multiple columns of a table. For example, a first column 410 may correspond to a first field or entry of a row that includes an identification for each row of the table. Furthermore, a second column 420 may correspond to a second field or entry of the rows that includes a numerical value or identification of the row or record. The second field or entry of each row may store data that is encrypted by a first type of encryption. For example, the numerical value of the second field or entry may be based on an Order-Preserving Encryption (OPE) that may arrange the encrypted data (e.g., the ciphertext) and corresponding data (e.g., the plaintext) that is encrypted in a numerical, alphabetical, or alphanumerical order. As a result, the rows of the table represented by the data structure 400 may be arranged in an order that is based on the field or entry that is encrypted based on OPE of the second column 420.

The data structure 400 may further include a third column 430 that may correspond to a third field or entry of the same row of the table represented by the data structure 400. The third field or entry may include encrypted data that is based on a different encryption than the OPE used to encrypt the second field or entry of the second column 420. The fields or entries in the third column 430 may not be ordered as the second column 420 and may not allow for the querying of the respective data. Thus, the data structure may include one or more columns that include encrypted data that has been encrypted by OPE and that may be queried to identify a particular record and one or more other columns that include encrypted data that has been encrypted by another encryption standard that is not OPE.

In some embodiments, the data in each of the columns may be encrypted by a different derived key. For example, a first derived key may be derived or generated based on a combination of the master key and an identification of the first column 410. The data for each record that is included in the first column 410 may be encrypted by the first derived key. The identification of the first column 410 may be a name of the first column 410 and a name of the table that is represented by the data structure 400. The data for each record that is included in the second column 420 may be encrypted by a second derived key that is generated by a combination of the master key and an identification of the second column 420. Similarly, the data for each record that is included in the third column 430 may be encrypted by a third derived key that is generated by a combination of the master key and an identification of the third column 430. Thus, each portion of data in a column of a record of the data structure 400 may be encrypted by using a different key that is derived from the same master key.

In operation, a node may provide a request for one or more records of the data structure 400. For example, the node may provide a query that requests for a particular record that includes encrypted data in the second column 420 with a numerical value of '7.' The numerical value may be the value of the encrypted data based on OPE. The record 440 may be identified as having encrypted data in the second column 420 with the numerical value of '7' and the storage resource may return the record 440 to the node that provided the query. The node may then generate the first derived key, second derived key, and the third derived key based on the master key as described above to separately decrypt the encrypted data from each of the columns (e.g., each entry or field) of the record 440.

In some embodiments, the data structure 400 may include additional columns specifying additional entries or fields for each record in the data structure 400. For example, each record may include a fourth column 450 that may specify a first message authentication code in an entry or field for each record. The first message authentication code may be generated based on a combination of the master key and the data stored at the record. For example, the first MAC may be generated based on a combination of the master key and the encrypted data stored at the other fields or entries of the respective record. A node that has received a record may use the first MAC of the record specified in the fourth column 450 to verify a validity of the record. For example, the node may generate another MAC based on a combination of the master key and additional information and may compare its generated MAC to the first MAC of the record to identify the validity of the record.

In some embodiments, the node may verify the validity of the data structure 400 based on a comparison with a root MAC. For example, the node may be aware of a root MAC for each data structure stored at a storage resource. The root MAC may be based on a combination of multiple other MACs. For example, the root MAC may be based on a hierarchical tree structure of MACs where a first MAC of a first record is combined with a second MAC of an adjacent second record to generate a first combined MAC. A second combined MAC may be generated based on a third MAC and a fourth MAC of a third and fourth record which are adjacent (e.g., a next record in the data structure) after the second record. Subsequently, the first combined MAC may be combined with the second combined MAC to generate another combined MAC (e.g., a third combined MAC). Each pair of adjacent MACs may be combined until a single root MAC remains. When the node receives a record from a particular data structure, the node may generate the root MAC for the record based on the encrypted data from the fields or entries of the columns of the record as well as additional MACs that are provided with the record in a path to the root MAC. The node may then compare the generated root MAC based on the record with its own root MAC. If the generated root MAC matches the known root MAC, then the record and data structure 400 may be considered valid and if the generated root MAC does not match the known root MAC, then the record and data structure 400 may not be considered valid.

The data structure 400 may include a fifth column 460 that may identify a computational message authentication code. For example, the computational MAC may be used by a node to verify that a requested record is not presently stored at the storage resource as described in further detail below in conjunction with FIG. 5. Furthermore, the data structure 400 may include a sixth column 470 that may identify a proximity of a record to another record of the data structure 400. For example, as shown, the sixth column 470 may include an entry for each record that identifies an adjacent record based on its OPE data of the second column 420. In some embodiments, the entries of the sixth column 470 may identify the next record after the current record where the next record is identified by the value of the entry or field of the second column 420 for the next or subsequent record. In alternative embodiments, the entries or fields of the sixth column 470 may specify the prior or previous record as opposed to the next or subsequent record. As a result, a particular record may include an entry or field that identifies another record based on the OPE data.

Figure 5:
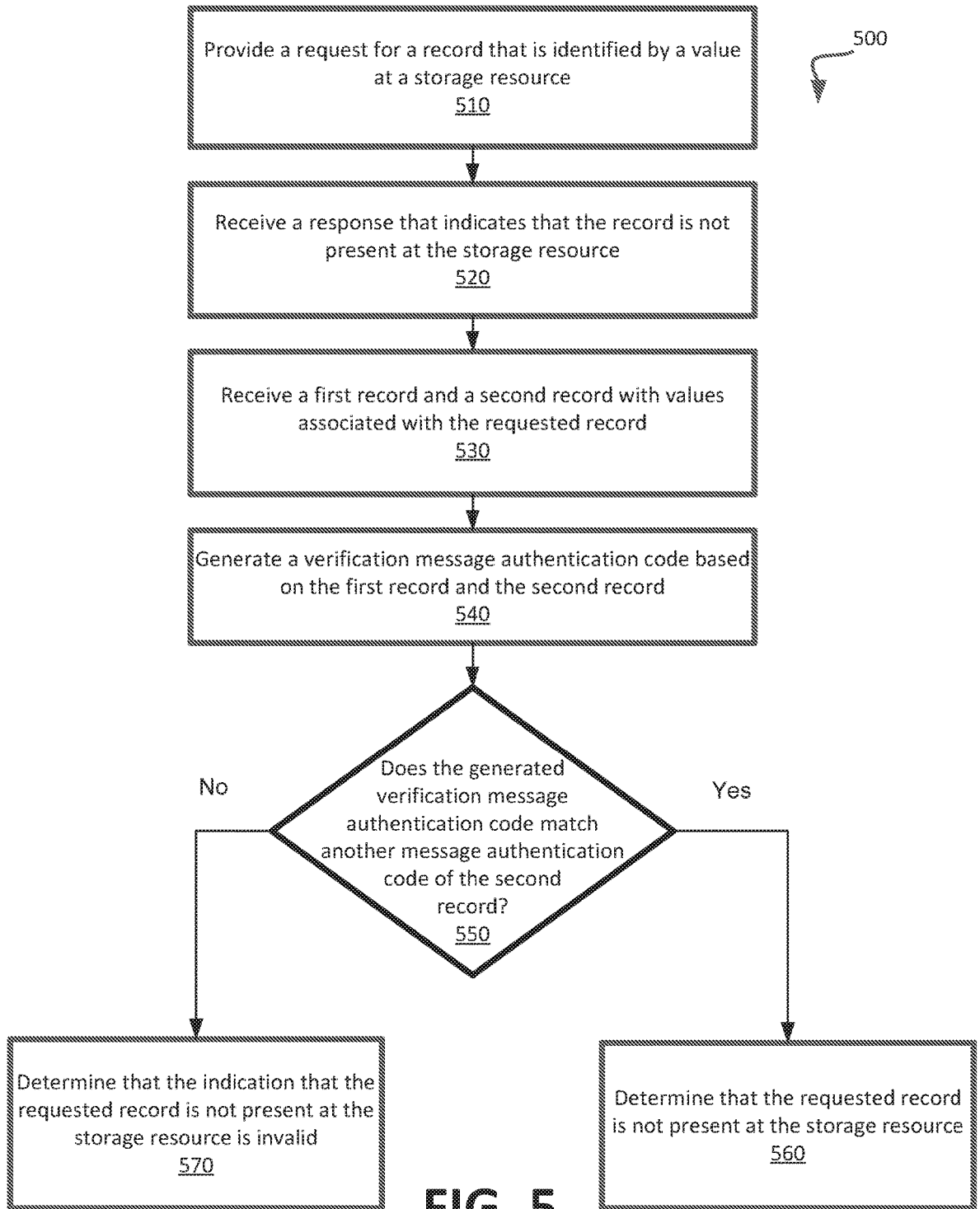
FIG. 5 illustrates a flow diagram of an example method to verify an indication of a record of secure data not being available at the storage resource in accordance with some embodiments of the present disclosure.

FIG. 5 illustrates a flow diagram of an example method 500 to verify an indication of a record of secure data not being available at the storage resource. In general, the method 500 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 may be performed by the node 110 or 120 of FIG. 1 or the self-encrypting key management service 230 of FIG. 2.

As shown in FIG. 5, the method 500 may begin with the processing logic providing a request for a record that is identified by a value (block 510). For example, a node may provide a request to a storage resource for a record that is identified by a numerical value associated with OPE data. The processing logic may receive a response that indicates that the record is not present at the storage resource (block 520). For example, the response may specify an error or other such indication that a record that is identified by the numerical value is not presently stored at the storage resource. Furthermore, the processing logic may receive a first record and a second record with values associated with the requested record (block 530). For example, the first record may include an entry for a first MAC value and the second record may include a corresponding entry for a second MAC value. The first record and the second record may each be adjacent to the requested record. For example, the first record may correspond to a numerical value that is before the numerical value of the requested record and the second record may correspond to another numerical value that is after the numerical value of the requested record. No other record may correspond to a numerical value between the first record and the requested record as well as between the second record and the requested record.

The processing logic may subsequently generate a verification message authentication code based on the first record and the second record (block 540). For example, the verification message authentication code may be based on another key that is derived from the master key and additional information (e.g., information identifying a particular column or row or entry of the record). The verification message authentication code may then be generated by combining the derived key with another MAC of the first record and contents of the second record. For example, the verification message authentication code may be generated by combining the derived key with the MAC of the first record, and the encrypted data contents of one or more entries or fields of the second record. The processing logic may subsequently determine whether the generated verification message authentication code matches with another verification message authentication code that is included in another field or entry of the second record. If the verification message authentication codes match, then the processing logic may determine that the requested record is not present at the storage resource (block 560). Otherwise, if the verification message authentication codes do not match, then the processing logic may determine that the indication that the requested record is not present at the storage resource is invalid (block 570). As such, the receiving node may determine that the requested record may be present at the storage resource.

As previously described, a new node may be added to the network cluster and may be provided a copy of the master key from another node of the network cluster. An authentication or attestation procedure may be performed when the new node is added to the network cluster. For example, the authentication or attestation procedure may verify that the new node is a valid node and is not an emulated or invalid node before the copy of the master key is provided to the new node.

Figure 6:
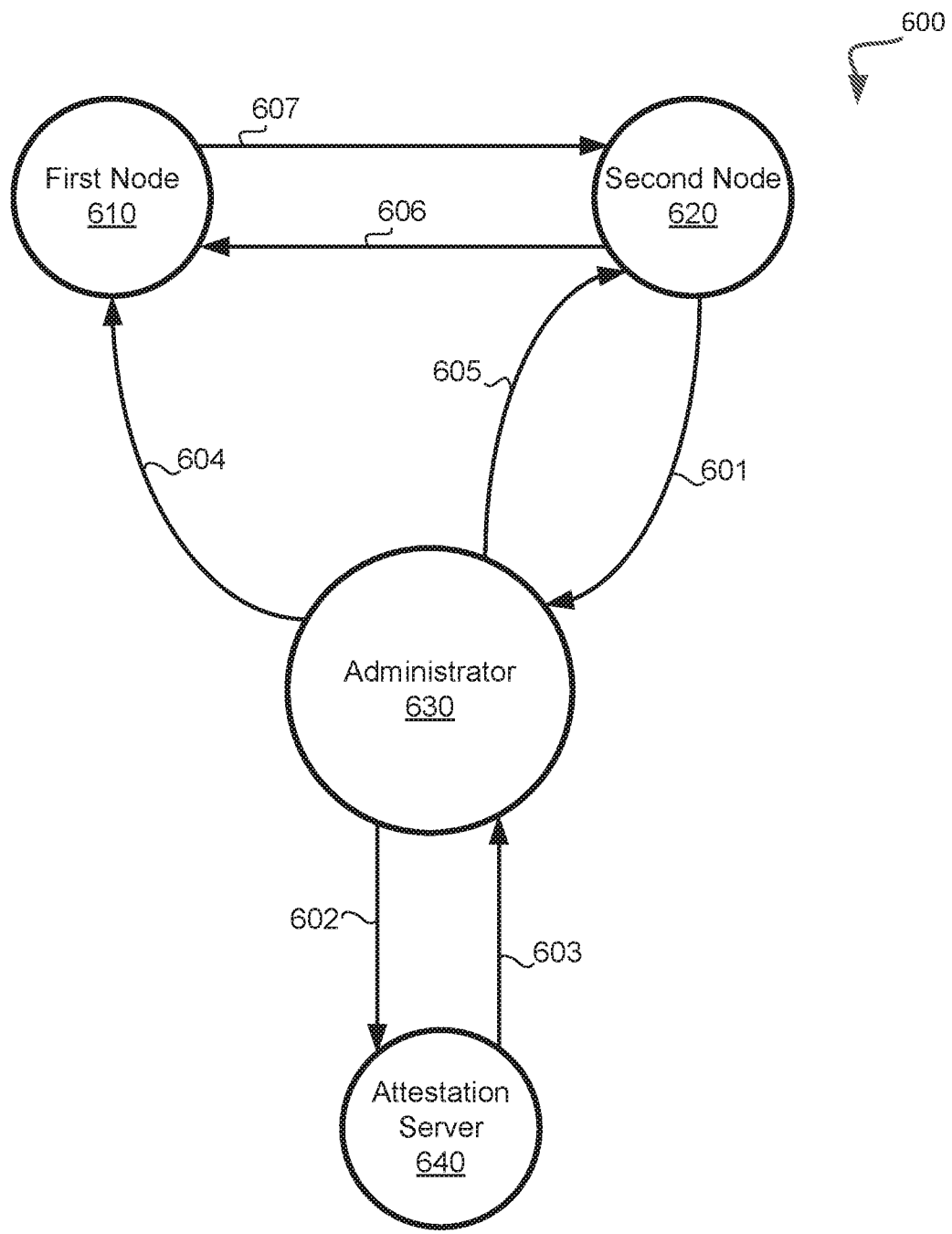
FIG. 6 illustrates an example environment to provide a master key from a first node to a second node of a secure cluster in which some embodiments of the disclosure may operate.

FIG. 6 illustrates an example environment 600 to provide a master key from a first node to a second node of a secure cluster. In general, the environment 600 may include a first node 610 and a second node 620 that may correspond to the node 110 and the node 120, respectively, of FIG. 1.

As shown in FIG. 6, the environment 600 may include a first node 610 and a second node 620. The first node 610 may include a master key. Each node in a network cluster corresponding to the environment 600 may include a copy of the master key to encrypt and/or decrypt data of a storage resource as previously described. The first node 610 include a master key that is to be provided to the second node 620 in response to a successful authentication of the second node 620. The environment 600 may include an administrator 630 (e.g., another network server) and an attestation server 640. In some embodiments, the attestation server 640 may correspond to a third party server associated with an entity that provides or manufactured the processing device providing the first node 610 (e.g., the processor 210 of FIG. 2).

In operation, the second node 620 may provide a request 601 to join a network cluster (i.e., a secure cluster of self-encrypting key management systems). For example, the request 601 may include attestation data of the second node 620. The attestation data may be based on an identification of a processor that is used to provide the second node 620. The request 601 may be received by an administrator 630 (e.g., a server associated with the first node 610) and may provide or relay the attestation data 602 that has been received from the second node 620 to the attestation server 640. Furthermore, the attestation server 640 may verify whether the attestation data from the second node 620 indicates that the second node 620 is provided by a valid processor provided or manufactured by an entity associated with the attestation server 640. If so, the attestation server 640 may provide a response 603 to the administrator 630 that the second node 620 is present or exists on a valid processor. Subsequently, the administrator 630 may provide a response 604 to the first node 610 to indicate that the first node 610 should register the second node 620 (e.g., that the second node should join the network cluster that includes the first node 610). For example, the administrator 630 may provide a public key of the second node 620 to the first node 610. Furthermore, after the first node 610 receives the indication to register the second node 620, the administrator 630 may provide a response 605 for the second node 620 to proceed with registering with the first node 610. For example, the second node 620 may provide a message 606 to the first node 610 where the message 606 is signed with the private key of the second node 620. The first node 610 may subsequently authenticate the message 606 from the second node 620 by using the previously received public key of the second node 620. After the first node 610 authenticates the message 606 from the second node 620, the first node 610 may provide a message 607 to the second node 620 where the message 607 includes a copy, or an encrypted copy, of the master key 611. In some embodiments, the message 607 may be signed by a private key of the first node 610 and verified by the second node 620 by using a known public key of the first node 610. As a result, the second node 620 may also use the copy of the master key 611 to encrypt and decrypt data at a storage resource that is also used by the first node 610.

Figure 7:
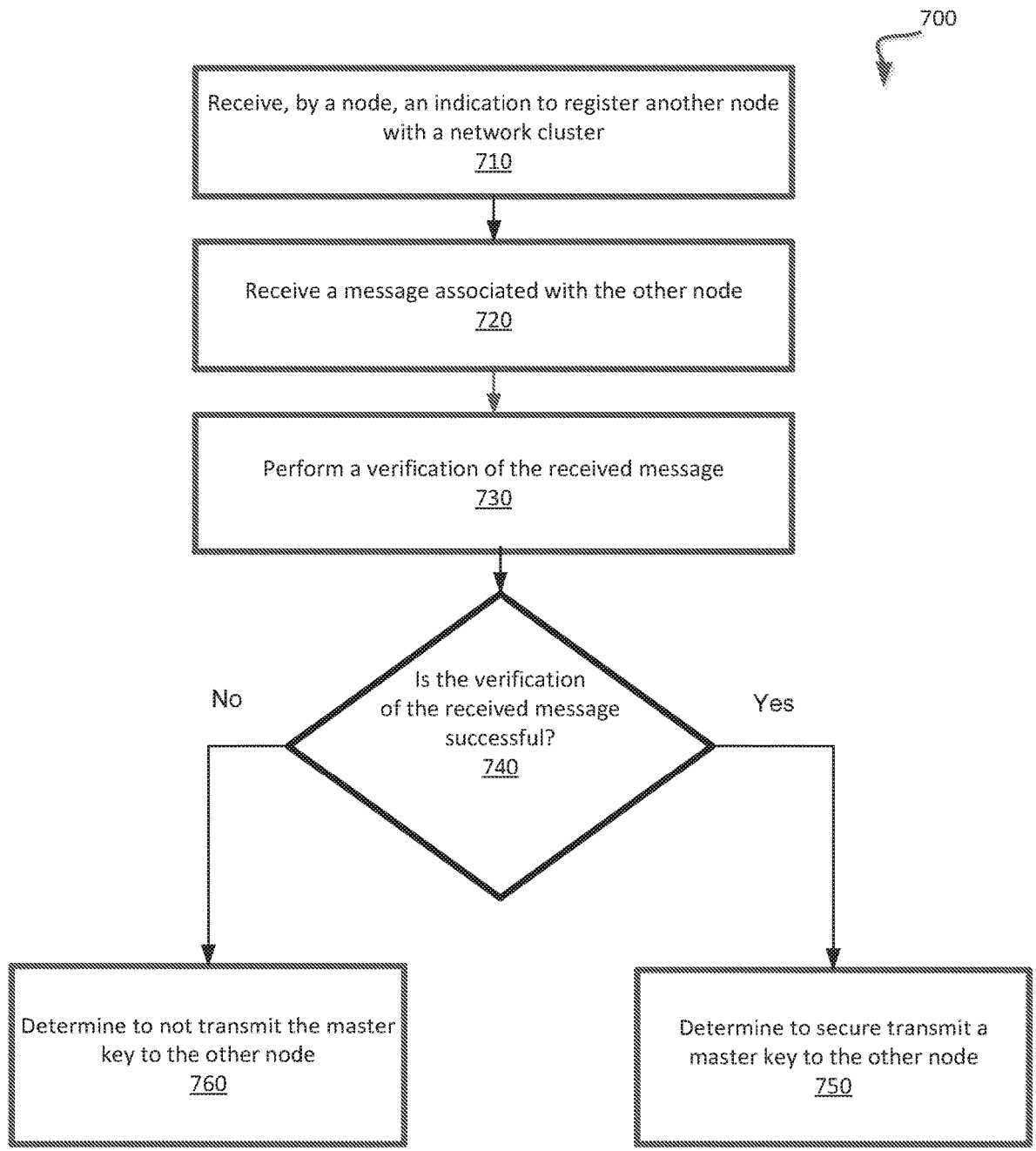
FIG. 7 illustrates a flow diagram of an example method to transmit a master key between nodes of a secure cluster in accordance with some embodiments of the present disclosure.

FIG. 7 illustrates a flow diagram of an example method 700 to transmit a master key. In general, the method 700 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 may be performed by the node 110 or 120 of FIG. 1 or the self-encrypting key management service 230 of FIG. 2.

As shown in FIG. 7, the method 700 may begin with the processing logic receiving an indication to register another node with a network cluster (block 710) and may receive a message associated with the other node (block 720). For example, a current node of the network cluster may receive a message from the other node that seeks to encrypt and/or decrypt data stored at a storage resource that is used by the other nodes of the network cluster. The processing logic may subsequently perform a verification of the received message (block 730). For example, the message may be signed by a private key associated with the other node and the receiving node may verify the signature of the message by using a known public key that is associated with an identification of the other node. The processing logic may further determine whether the verification of the received message was successful (block 740). If the verification of the received message was successful, then the processing logic may determine to securely transmit a master key of the receiving node to the other node (block 750). Otherwise, if the received message was not successful, then the processing logic may determine to not transmit the master key of the receiving node to the other node (block 760).

In some embodiments, the master key may be provided or transmitted from the first node to the second node based on multiple attestation services. For example, as previously described, the registering of a node to a cluster may be based on an attestation server that is associated with an entity that provides or manufactured the processing device providing the first node of the cluster. Additional attestation services may be used to register the second node with the first node of the cluster as described in conjunction with FIG. 8.

Figure 8:
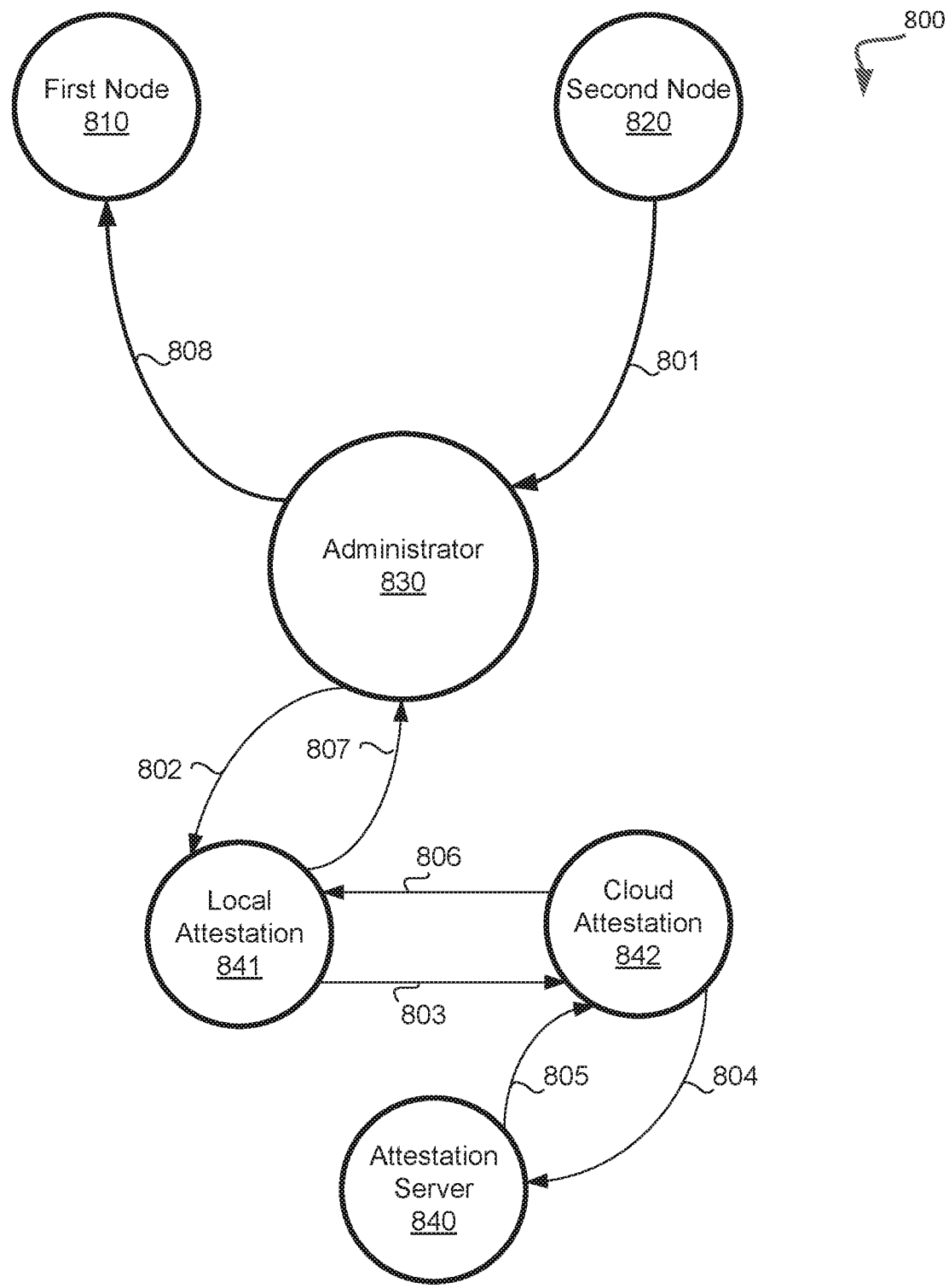
FIG. 8 illustrates another example environment to provide a master key from a first node to a second node of a secure cluster in accordance with some embodiments of the present disclosure.

FIG. 8 illustrates another example environment 800 to provide a master key from a first node to a second node of a secure cluster. In general, the environment 800 may include a first node 810 and a second node 820 that may correspond to the node 110 and the node 120, respectively, of FIG. 1.

As shown in FIG. 8, the environment 800 may include a first node 810 that is part of a network cluster, a second node 820 that is seeking to register with the network cluster, an administrator 830, an attestation server 840, a local attestation service 841, and a cloud attestation service 842.

In operation, the second node 820 may provide a message 801 to the administrator 830. For example, the message 801 may include attestation data that is signed or based on a public key of the second node 820. The attestation data may be based on one or more factors including, but not limited to, attestation data that is generated by a processor on the second node 820, an attestation that is generated by another application that is provided by the processor providing the second node 820 (e.g., another application in a secure enclave that is provided by the same processor that is providing the second node 820), or a software state associated with the second node 820. For example, the attestation data may be based on a cryptographic key of another application provided on the second node 820 which is subsequently combined with a function of the processor providing the second node 820 to generate the attestation data.

The administrator 830 may receive the message 801 and may transmit the message 801 as a message 802 to the local attestation service 841. In some embodiments, the local attestation service 841 may be another application that is assigned to a secure enclave provided by a processor (e.g., an application 240A to 240Z of FIG. 2 that has been assigned to a secure enclave). The local attestation service 841 may verify the attestation data from the message 802. For example, another cryptographic key of the local attestation service 841 may be used to verify the attestation data. The local attestation service 841 may then provide a message 803 to a cloud attestation service 842 which may also verify the attestation data and/or provide another message 804 to the attestation server 840. The cloud attestation service 842 may be another server that is associated with the self-encrypting key management system that corresponds to the node 810. The attestation server 840 may then transmit a message 805 to cloud attestation service 842 (or the local attestation service 841 if the cloud attestation service 842 is not used). The message 805 may indicate whether the attestation data received by the attestation server 840 was generated and provided by a processor provided or manufactured by an entity associated with the attestation server 840. Subsequently, the local attestation service 841 may receive a message 806 from the cloud attestation service 842 that includes the indication from the attestation server 840. The local attestation service may then provide a message 807 back to the administrator 830 that indicates that the attestation of the second node 820 was successful or was not successful. If the attestation of the second node 820 was successful, then the administrator 830 may provide a message 808 to the first node 810 to indicate that the first node 810 should register the second node 820 as described in conjunction with FIG. 6.

In some embodiments, a certificate authority may provide a digital certificate to the first node 810 and the second node 820 to register the second node 820 with the secure cluster. For example, the digital certificate may include a public key and an entity (e.g., a particular node) that is assigned to the public key. The certificate authority may provide a digital certificate to the first node 810 that includes the public key of the second node 820 so that the first node 810 may authenticate a subsequent message signed by the corresponding private key of the second node 820. In some embodiments, the certificate authority may provide the digital certificate to the second node 820 to authenticate and register with the first node 810.

Figure 9:
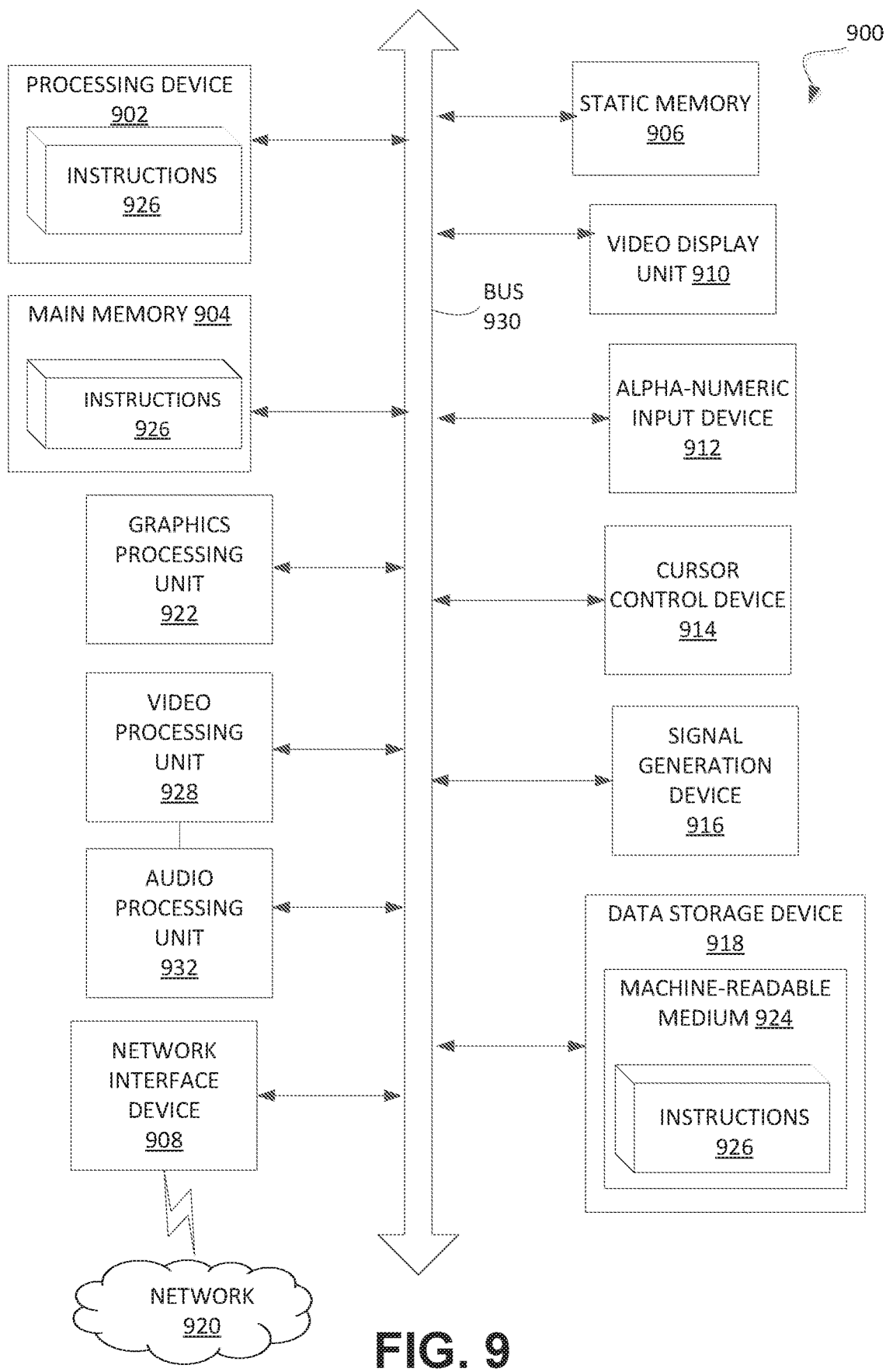
FIG. 9 illustrates an example computer system in which embodiments of the present disclosure operate.

FIG. 9 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM), etc.), a static memory 906 (e.g., flash memory, static random access memory (SRAM), etc.), and a data storage device 918, which communicate with each other via a bus 930.

Processing device 902 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 is configured to execute instructions 926 for performing the operations and steps discussed herein.

The computer system 900 may further include a network interface device 908 to communicate over the network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable storage medium 924 (also known as a computer-readable medium) on which is stored one or more sets of instructions or software 926 embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

In one implementation, the instructions 926 include instructions to implement functionality corresponding to a self-encrypting key management service that is represented by a node (e.g., nodes 110 or 120 of FIG. 1). While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method comprising:
   providing a request for encrypted data stored at a storage resource;
   receiving the encrypted data, wherein the encrypted data corresponds to a record comprising first and second entries, a first entry name is assigned to the first entry, and a second entry name is assigned to the second entry;
   identifying authentication information at a first portion of the received encrypted data, wherein the first portion corresponds to the first entry;
   deriving a cryptographic key based on a combination of an identification of the first portion of the received encrypted data and a master key, wherein the identification of the first portion of the received encrypted data comprises the first entry name;
   generating, by a processing device, additional authentication information based on a combination of the derived cryptographic key and another portion of the received encrypted data, wherein the another portion corresponds to the second entry;
   verifying the received encrypted data by comparing the authentication information at the first portion of the received encrypted data with the generated additional authentication information;
   in response to verifying the received encrypted data, deriving a second cryptographic key based on a combination of an identification of the another portion of the received encrypted data and the same master key used to derive the cryptographic key, wherein the identification of the another portion of the received encrypted data comprises the second entry name; and
   decrypting the another portion of the received encrypted data by using the second cryptographic key.

2. The method of claim 1, wherein the encrypted data is received by a first node of a cluster of nodes, wherein a copy of the master key is further used by a second node of the cluster of nodes to derive a copy of the second cryptographic key and to decrypt the another portion of the encrypted data that is received by the second node.

3. The method of claim 1, further comprising:
   providing a request for a second encrypted data stored at the storage resource;
   receiving an indication that the second encrypted data is not present at the storage resource, the indication further comprising a first record corresponding to third encrypted data and a second record corresponding to fourth encrypted data stored at the storage resource;
   deriving a verification key based on a combination of the master key and an identification of a portion of the second record;
   generating a verification code based on a combination of the verification key, at least a portion of the first record, and at least a portion of the second record; and
   determining whether the second encrypted data is present at the storage resource based on a comparison of the generated verification code and another verification code of the second record.

4. The method of claim 3, wherein the request for the second encrypted data stored at the storage resource is based on an order-preserving encryption (OPE) value, and wherein an OPE value of the first record is before an OPE value of another record corresponding to the second encrypted data, and wherein the OPE value of the second record is after the OPE value of the another record corresponding to the second encrypted data.

5. The method of claim 1, wherein the master key is stored at a first node of a cluster of nodes, the method further comprising:
   receiving, by the first node, a request from a second node to join the cluster of nodes;
   performing a verification operation associated with the second node; and
   in response to the verification operation indicating that the second node has been successfully verified, transmitting the master key from the first node to the second node, the master key being used by the second node to encrypt and decrypt data stored at the storage resource.

6. The method of claim 5, wherein the performing of the verification operation of the second node is further based on one or more of a local attestation service or a cloud attestation service, the local attestation service corresponding to an application assigned to a secure enclave associated with the second node, and the cloud attestation service corresponding to a remote server.

7. A system comprising:
a memory; and
a processing device, operatively coupled with the memory, to:
provide a request for encrypted data stored at a storage resource;
receive the encrypted data, wherein the encrypted data corresponds to a record comprising first and second entries, a first entry name is assigned to the first entry, and a second entry name is assigned to the second entry;
identify authentication information at a first portion of the received encrypted data, wherein the first portion corresponds to the first entry;
derive a cryptographic key based on a combination of an identification of the first portion of the received encrypted data and a master key, wherein the identification of the first portion of the received encrypted data comprises the first entry name;
generate additional authentication information based on a combination of the derived cryptographic key and another portion of the received encrypted data, wherein the another portion corresponds to the second entry;
verify the received encrypted data by comparing the authentication information at the first portion of the received encrypted data with the generated additional authentication information;
in response to verifying the received encrypted data, derive a second cryptographic key based on a combination of an identification of the another portion of the received encrypted data and the same master key used to derive the cryptographic key, wherein the identification of the another portion of the received encrypted data comprises the second entry name; and
decrypt the another portion of the received encrypted data by using the second cryptographic key.

8. The system of claim 7, wherein the encrypted data is received by a first node of a cluster of nodes, wherein a copy of the master key is further used by a second node of the cluster of nodes to derive a copy of the second cryptographic key and to decrypt the another portion of the encrypted data that is received by the second node.

9. The system of claim 7, wherein the processing device is further to:
provide a request for a second encrypted data stored at the storage resource;
receive an indication that the second encrypted data is not present at the storage resource, the indication further comprising a first record corresponding to third encrypted data and a second record corresponding to fourth encrypted data stored at the storage resource;
derive a verification key based on a combination of the master key and an identification of a portion of the second record;
generate a verification code based on a combination of the verification key, at least a portion of the first record, and at least a portion of the second record; and
determine whether the second encrypted data is present at the storage resource based on a comparison of the generated verification code and another verification code of the second record.

10. The system of claim 9, wherein the request for the second encrypted data stored at the storage resource is based on an order-preserving encryption (OPE) value, and wherein an OPE value of the first record is before an OPE value of another record corresponding to the second encrypted data, and wherein the OPE value of the second record is after the OPE value of the another record corresponding to the second encrypted data.

11. The system of claim 7, wherein the master key is stored at a first node of a cluster of nodes, and wherein the processing device is further to:
receive, by the first node, a request from a second node to join the cluster of nodes;
perform a verification operation associated with the second node; and
in response to the verification operation indicating that the second node has been successfully verified, transmit the master key from the first node to the second node, the master key being used by the second node to encrypt and decrypt data stored at the storage resource.

12. The system of claim 11, wherein the performing of the verification operation of the second node is further based on one or more of a local attestation service or a cloud attestation service, the local attestation service corresponding to an application assigned to a secure enclave associated with the second node, and the cloud attestation service corresponding to a remote server.

13. A non-transitory computer readable medium comprising data that, when accessed by a processing device, cause the processing device to perform operations comprising:
providing a request for encrypted data stored at a storage resource;
receiving the encrypted data, wherein the encrypted data corresponds to a record comprising first and second entries, a first entry name is assigned to the first entry, and a second entry name is assigned to the second entry;
identifying authentication information at a first portion of the received encrypted data, wherein the first portion corresponds to the first entry;
deriving a cryptographic key based on a combination of an identification of the first portion of the received encrypted data and a master key, wherein the identification of the first portion of the received encrypted data comprises the first entry name;
generating, by the processing device, additional authentication information based on a combination of the derived cryptographic key and another portion of the received encrypted data, wherein the another portion corresponds to the second entry;
verifying the received encrypted data by comparing the authentication information at the first portion of the received encrypted data with the generated additional authentication information;
in response to verifying the received encrypted data, deriving a second cryptographic key based on a combination of an identification of the another portion of the received encrypted data and the same master key used to derive the cryptographic key, wherein the identification of the another portion of the received encrypted data comprises the second entry name; and decrypting the another portion of the received encrypted data by using the second cryptographic key.

14. The non-transitory computer readable medium of claim 13, wherein the encrypted data is received by a first node of a cluster of nodes, wherein a copy of the master key is further used by a second node of the cluster of nodes to derive a copy of the second cryptographic key and to decrypt the another portion of the encrypted data that is received by the second node.

15. The non-transitory computer readable medium of claim 13, the operations further comprising:

providing a request for a second encrypted data stored at the storage resource;

receiving an indication that the second encrypted data is not present at the storage resource, the indication further comprising a first record corresponding to third encrypted data and a second record corresponding to fourth encrypted data stored at the storage resource;

deriving a verification key based on a combination of the master key and an identification of a portion of the second record;

generating a verification code based on a combination of the verification key, at least a portion of the first record, and at least a portion of the second record; and determining whether the second encrypted data is present at the storage resource based on a comparison of the generated verification code and another verification code of the second record.

16. The non-transitory computer readable medium of claim 15, wherein the request for the second encrypted data stored at the storage resource is based on an order-preserving encryption (OPE) value, and wherein an OPE value of the first record is before an OPE value of another record corresponding to the second encrypted data, and wherein the OPE value of the second record is after the OPE value of the another record corresponding to the second encrypted data.

17. The non-transitory computer readable medium of claim 13, wherein the master key is stored at a first node of a cluster of nodes, the operations further comprising:

receiving, by the first node, a request from a second node to join the cluster of nodes;

performing a verification operation associated with the second node; and in response to the verification operation indicating that the second node has been successfully verified, transmitting the master key from the first node to the second node, the master key being used by the second node to encrypt and decrypt data stored at the storage resource.

* * * * *